Patented Feb. 27, 1934

1,948,573

UNITED STATES PATENT OFFICE 1,948,573

PROCESS FOR THE PRODUCTION OF RESIN-ACID CONDENSATION PRODUCTS

Ewald Fonrobert and Arthur Greth, Wiesbaden, Germany, assignors to Resinous Products & Chemical Co., Inc., Philadelphia, Pa.

No Drawing. Application January 28, 1930, Serial No. 424,131, and in Germany August 19, 1929

11 Claims. (Cl. 260—98)

Apart from the production of resin-acid esters from resin-acids with alcohols with higher boiling points, as for instance glycol, glycerine and the like by merely boiling the mixture of acid and alcohol with or without the addition of catalytic means, the production of derivatives of natural or synthetic resin-acids till now met with considerable difficulties owing to the high molecular size of the resin component and the reaction inertia connected therewith. There are known, it is true, some processes for attaining this purpose, which, however, have failed so far to prove of any practical value whatsoever. For instance resin-acid esters are obtained from the acids of colophony by changing them first into their sodium salt and treating the latter with toxic agents such as alkylhalides or alkylsulphates. This method, however, is an extremely expensive one. The production of pure resin acid derivatives by means of the chlorides of said acids met with unsurmountable difficulties because most of the resin-acids are easily halogenated in the nucleus, for which reason all reactions with halogens lead to derivatives containing halogen. By a secondary splitting off of halogenhydracid the reaction mixtures are always colored very darkly. As a matter of fact, pure resin-acid derivatives apart from the previously mentioned esters from alcohols of higher boiling points, have not become available practically till now.

We now have made the surprising observation, that resin-acid-anhydrides, contrary to expectation, are sufficiently capable of reaction for reacting in a manner known per se with alcohols, amines, phenols and similar bodies. This observation was all the less to be anticipated because the existence of the resin-acid-anhydrides had so far been looked upon with doubt. Dupont, for instance, still doubts the formation of the abietic acid anhydride described by Fonrobert and Pallauf, and he merely considers it to be an abietic acid free of water. It may, however, be proved, that in fact an anhydride is present, as may be gathered also from the reactions upon which the present invention is based.

Like other organic acid-anhydrides the resin-acid anhydrides show the following reactions:

(1) Boiled with alcohols they yield, apart from regenerated resin-acid, the corresponding resin-acid ester.

(2) Treated with phenols, they yield the corresponding phenol-ester while a molecular proportion of resin-acid is regenerated.

(3) With amines and amides, amide combinations are formed which may easily be separated from the acid regenerated in this case also or from the salt like combination formed from the latter and the basic amine or amide.

(4) With acid esters of such acids, the anhydrides of which are distillable, they are transformed by alcoholysis in such a manner, that the resin-acid ester is formed whilst the anhydride of the other acid is distilled off.

As resin-acids may be considered, in the scope of the present invention, all acid components of natural and synthetic resins, as far as they are at all capable of forming an anhydride. Probably the anhydride of the acids contained in the colophony, which is known as abietic acid anhydride, will possess the greatest practical value. Furthermore the anhydrides of still acid rearrangement products or derivatives of the acids of the colophony should essentially be considered, such as the anhydrides of the pyroabietic acid, tetrahydroabietic acid etc. and likewise the anhydrides of other natural or synthetic resin acids.

The production of the corresponding anhydrides is effected in a manner known per se, for instance by boiling the acids, which may have previously been purified more or less, with acetic anhydride. It is not absolutely necessary to free the acid anhydrides formed from unaltered resin acids for further treatment, particularly not when said anhydrides are subjected to reactions during which part of the resin acid is regenerated. In such cases it will be possible to proceed from the crude product of dehydration, the free resin acids being only removed after the further treatment of said products.

During the further treatment of the anhydrides or the products containing anhydrides, the work may be carried out with or without increased pressure and with or without the addition of diluting agents.

As second components capable of reaction all alcohols, phenols, amides, amines without any distinction whatsoever may be considered, as well as all esters the constitutent acids of which are forming distillable anhydrides. The said compounds may be employed separately, in mixtures of homologous products, but also in any desired mixture. Special results are attained with combinations which are simultaneously belonging to two groups of bodies reacting with anhydrides, as for instance with monoethanol amine.

The great advantage of the process is embodied in the fact that pure resin acid derivatives are obtained which may easily be separated from the other products of reaction and which with security are free from halogens, inorganic acids or salts. It is from these reasons that it will be possible to obtain some combinations in a very light condition and, under certain circumstances, in a crystalline form.

Example 1

By heating French colophony for 24 hours with 2 to 3 times the quantity of acetic anhydride and subsequent distilling off the volatile components an anhydrated product is obtained, from which the crystalline abietic acid anhydride having a melting point of 149° to 151° C. may be separated by repeated recrystallization.

If this abietic acid anhydride, either crude or in the purified state, is mixed with such a quantity of anhydrous ethyl-alcohol in excess that a fairly saturated solution is produced, and if this solution is heated to 80–150° C. under ordinary pressure with reflux during a few hours or under an increased pressure for a correspondingly shorter period, one molecule abietic acid anhydride will form one molecule abietic acid ethylester and one molecule free abietic acid. The latter may be removed from the reaction mixture by extraction with diluted alkalis.

The separation of the reaction products by fractional distillation can be carried through in the present case only under very great difficulties, owing to the boiling points being so extremely close to one another. This method will be more considered in conjunction with esters of alcohols possessing a higher boiling point (see Example 2).

The abietic acid ethylester thus obtained is purified by distillation and shows the chemical and physical properties which it is known to possess. It is, however, distinguished from the corresponding products of known processes by its high degree of purity. Above all, it is free from any inorganic components.

Example 2

Employing the various butylalcohols instead of the ethylalcohol used in Example 1, the corresponding butylesters of the abietic acid are obtained. The reaction takes an analogous course with all higher monohydric and polyhydric alcohols.

Example 3

100 parts of abietic acid anhydride are melted together with 100 parts of phenol and heated to 120–150° C. for a period of 1 to 2 hours. From the oily reaction product the phenol in excess is distilled off or washed out by means of alkalis together with the abietic acid formed. By distilling the residue the abietic acid phenyl ester is obtained in almost neutral form.

Example 4

Abietic acid anhydride is dissolved in not too concentrated a form in a suitable solvent (anhydrous ether, anhydrous alcohol, benzol, mixtures of ether and benzol and so on). Into this solution dried ammonia gas is introduced under ordinary or increased pressure, with or without simultaneous heating, and whilst being shaken or stirred. The solvent is recovered from the reaction mixture by distillation. The residue is composed of molecular quantities of abietic acid amide and abietic acid ammonium salt. The latter is washed out directly, or decomposed by shaking with acids and removed. The residue will then be subjected to fractional vacuum distillation. In this way the abietic acid amide is obtained in the form of an almost neutral, light colored, yellowish resin, the melting point of which lies above 160° C.

Example 5

100 parts of abietic acid anhydride are dissolved in 20 to 30 parts of freshly distilled aniline, and the solution is kept at a temperature of 120–150° C. for a period of from 1 to 2 hours. By means of fractional distillation or by washing out successively with acids and aqueous alkalis the reaction mixture is separated into aniline in excess, abietic acid and abietic acid anilide. The latter forms an almost neutral, light colored, yellowish resin having a melting point of about 70–80° C.

Example 6

100 parts of abietic acid anhydride are heated to a temperature of about 300° C. together with 50 parts of phthalic acid diethylester under a carbonic acid atmosphere with or without increased pressure during a period of some hours. The reaction mixture thus obtained is distilled in vacuo and simultaneously separated into abietic acid ethylester and phthalic acid anhydride.

In a corresponding manner it will be possible to form abietic acid butyl-ester from phthalic acid dibutylester.

Example 7

Pyroabietic acid produced by a prolonged heating of abietic acid or colophony, is changed, according to the process described in Example 1, into the anhydride and caused to react in the manner described in Examples 1–6 with compounds of the kinds indicated there. As a result the corresponding esters or amide or anilide of the pyroabietic acid are obtained.

Example 8

In the same way as the pyroabietic anhydride of Example 7, tetrahydroxy abietic acid anhydride may be employed. Tetrahydroxy abietic acid is produced by oxidation of abietic acid with potassium permanganate in a known manner.

Having now particularly described and ascertained the nature of our said invention, what we claim is:

1. A process for the production of resin acid condensation products, consisting in transforming the resin acid into its anhydride by heating the said acid with the anhydride of aliphatic monocarboxylic acid of the lower fatty acid series and thereupon treating the anhydride thus formed with alcohols.

2. A process for the production of esters of colophony which comprises heating colophony with the anhydride of an aliphatic monocarboxylic acid of the lower fatty acid series, and subsequently condensing the abietic anhydride thus formed with a member of the group consisting of alcohols, and esters of alcohols which are decomposed under the reaction conditions to yield readily volatile acids.

3. A process for the production of abietic ester which comprises heating colophony with acetic anhydride and subsequently condensing the reaction product thereby obtained with an alcohol.

4. A process for the production of abietic ester which comprises heating colophony with acetic anhydride and subsequently condensing the reaction product thereby obtained with ethyl alcohol.

5. A process for the production of abietic ester which comprises heating colophony with acetic anhydride and subsequently condensing the reaction product thereby obtained with butyl alcohol.

6. A process for the production of abietic ester which comprises heating colophony with acetic anhydride and subsequently condensing the reaction product thereby obtained with phenol.

7. A process for the production of resin condensation products which comprises treating a resin acid anhydride with one of the group of alcohols, and esters of alcohols which are decomposed under the reaction conditions to yield readily volatile acids.

8. A process for the production of resin acid condensation products which consists in converting the resin acid into its anhydride by heating the said resin acid with the anhydride of an aliphatic monocarboxylic acid of the lower fatty acid series, and heating the resin acid anhydride thus formed, with a member of the group consisting of alcohols and esters of alcohols which are readily decomposed under the reaction conditions to volatilize the acidic component of said esters.

9. A process for the production of resin acid condensation products which consists in converting the resin acid into its anhydride by heating the resin acid with the anhydride of an aliphatic monocarboxylic acid of the lower fatty acid series, and heating the crude resin acid anhydride thus obtained, containing unaltered free resin acid, with a member of the group consisting of alcohols and esters of alcohols which are readily decomposed under the reaction conditions to volatilize the acidic component of said esters.

10. A process for the production of resin acid condensation products which consists in heating the resin acid with acetic anhydride, distilling off the readily volatile parts, and heating the reaction product thus obtained with a member of the group consisting of alcohols, and esters of alcohols which are decomposed under the reaction conditions to volatilize the acidic component of said esters.

11. A process of the kind set forth in claim 8 characterized in that the resin acid anhydride first formed is heated at super-atmospheric pressure with a member of the group consisting of alcohols and esters of alcohols which are decomposed under the reaction conditions to yield readily volatile acids.

EWALD FONROBERT.
ARTHUR GRETH.